United States Patent Office 2,745,869
Patented May 15, 1956

2,745,869

STABILIZED COMPOSITIONS COMPRISING MONOMERIC 1,1-DICYANO ETHYLENE

Eugene F. Sachara, Parma Heights, Ohio, assignor to The B. F. Goodrich Company, New York, N. Y., a corporation of New York No Drawing. Application November 17, 1953, Serial No. 392,741

9 Claims. (Cl. 260—465.8)

This invention relates to stabilized compositions comprising monomeric 1,1-dicyano ethylene and pertains more particularly to composition comprising the crude product containing monomeric 1,1-dicyano ethylene which is obtained by pyrolyzing 1-acetoxy-1,1-dicyano ethane, and also comprising halosulfonic acids and sulfuryl halide as stabilizers for the monomeric 1,1-dicyano ethylene.

This application is a continuation-in-part of application No. 288,050, filed May 15, 1952, by Eugene F. Sachara, now abandoned, which disclosed halosulfonic acids as suitable stabilizers for crude unstable monomeric 1,1-dicyano ethylene.

It is disclosed in U. S. Patent 2,476,270, that monomeric 1,1-dicyano ethylene can be obtained by pyrolytic decomposition at temperatures of about 400° C. to 750° C. of 1-acetoxy-1,1-dicyano ethane (also known as di-acetyl cyanide) followed by separation of the monomeric 1,1-dicyano ethylene from the pyrolysis product. The monomeric 1,1-dicyano ethylene as thus obtained in relatively pure form is a remarkable monomer which can be polymerized, either alone or with other polymerizable monomers in a non-ionic medium to give homopolymers and interpolymers which can be utilized to form extremely valuable filaments, films, shaped articles and the like.

The pyrolysis of 1-acetoxy-1,1-dicyano ethane proceeds substantially as follows:

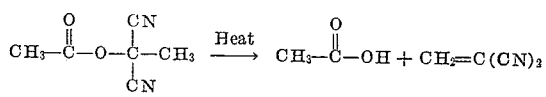

However, it has been observed in carrying out this reaction on a pilot plant or commercial scale, that the 1-acetoxy-1,1-dicyano ethane is not completely cracked pyrolytically to 1,1-dicyano ethylene and acetic acid; rather, there are several other unidentified products in the product resulting from the pyrolysis reaction.

It has been further observed that one or more of the unidentified products catalyzes the ionic polymerization of the 1,1-dicyano ethylene monomer, so that the 1-acetoxy-1,1-dicyano ethylene pyrolysis product is ordinarily an inherently unstable material, and in the absence of a stabilizer (or even in the presence of certain known stabilizers) the monomeric 1,1-dicyano ethylene present in the pyrolysis product rapidly polymerizes ionically to form a low molecular weight 1,1-dicyano ethylene polymer that is of little or no value as such. This polymer can be separated from the remaining constituents in the pyrolysis product and then depolymerized to give the monomeric 1,1-dicyano ethylene in fairly pure form, as disclosed in U. S. Patent 2,535,827, but such a series of operations is obviously not desirable from the standpoint of efficiency and economy in a commercial plant.

Accordingly, it is an object of the present invention to provide materials which will effectively stabilize crude monomeric 1,1-dicyano ethylene against ionic polymerization and will inhibit the activity of any deleterious polymerization catalyst which may be present in the crude 1-acetoxy-1,1-dicyano ethane pyrolysis product. It is another object of this invention to provide stabilized compositions containing the 1-acetoxy-1,1-dicyano ethane pyrolysis product, in which compositions the 1,1-dicyano ethylene present remains in the monomeric form for extended periods of time, and which can be used as such, without the necessity for separation and purification of the monomeric 1,1-dicyano ethylene, in preparing useful polymers and interpolymers of 1,1-dicyano ethylene. Other objects will be apparent from the description which follows.

It has now been discovered that the above and other objects are attained by stabilizing crude monomeric 1,1-dicyano ethylene, and particularly the crude pyrolysis product of 1-acetoxy-1,1-dicyano ethane with a compound having the formula

wherein X is a halogen and Y is a radical selected from the class consisting of halogens and hydroxyl groups. In this manner, compositions are obtained in which the 1,1-dicyano ethylene remains in the monomeric form for a relatively long period of time. It thus becomes possible to store the 1-acetoxy-1,1-dicyano ethane pyrolysis product before using it. It also becomes possible to utilize such compositions in polymerization recipes and to obtain a useful high molecular weight polymer or interpolymer of 1,1-dicyano ethylene, rather than the unsatisfactory polymers obtained when no stabilizer is utilized to inhibit the catalytic effect of the unidentified products in the pyrolysis mixture.

Any desired stabilizer selected from the class consisting of halosulfonic acids and sulfuryl halide including chlorosulfonic acid and sulfuryl chloride, which are preferred, fluorosulfonic acid, bromosulfonic acid, iodosulfonic acid, sulfuryl fluoride, sulfuryl bromide, or sulfuryl chloride fluoride may be utilized as the stabilizer according to this inveniton. These acids possess the structure

wherein X is a halogen, and Y is a radical selected from the class consisting of halogens and hydroxyl groups.

No special procedures are necessary in preparing the compositions of this invention. For example, they may be prepared simply by placing the stabilizer in the receiver in which the 1-acetoxy-1,1-dicyano ethane pyrolysis product is condensed and collected. A more desirable expedient, however, consists in spraying the stabilizer into the condensing pyrolysis product as the latter enters the receiver, thus assuring more rapid and effective contact of the stabilizer with pyrolysis product. Also, the stabilizer may be incorporated in a quick quench liquid, if such is utilized to condense the pyrolysis product vapors, as disclosed in copending application Serial No. 286,496, filed May 7, 1952, now issued as U. S. 2,663,725, or if desired, the stabilizer may even be added to the 1-acetoxy-1,1-dicyano ethane before its pyrolysis, in which event it is carried over into the pyrolysis product.

Any desired quantity of stabilizer may be utilized, although the optimum amount varies slightly with each batch of pyrolysis product, probably because of the different degree of 1-acetoxy-1,1-dicyano ethane decomposition obtained from run to run. In general, however, only small quantities of the order of about 0.01% to 1 or 2% by weight (based on the weight of the pyrolysis product) are desirably utilized, although amounts as high as 5 to 10% by weight or even higher may be employed, if desired. Large amounts of stabilizer are not preferably utilized, however, both for reasons of economy as well as the fact that the stabilizing action tends to drop off when large amounts of stabilizer are present, although such compositions do remain stable for a longer period of time than pyrolysis products containing no stabilzer.

The following examples are intended to illustrate the unusual stability possessed by the novel compositions of this inveniton. They are not, however, to be construed as a limitation upon the scope thereof, for there are numerous possible variations and modifications which will be readily apparent to those skilled in the art.

Examples I–V

Chlorosulfonic acid and fluorosulfonic acid are placed in samples of crude pyrolysis product obtained by pilot plant pyrolysis of 1-acetoxy-1,1-dicyano ethane at a temperature of 510° C. Such product contains 1,1-dicyano ethylene, acetic acid and unidentified products, with a 1,1-dicyano ethylene content of about 40%. The resulting mixtures are maintained at 100° C. The stabilizer utilized, stabilizer concentration and gel time (time required for the monomer to polymerize to a non-flowing gel) are recorded in the table below:

| Example | Stabilizer | Stabilizer Concentration (Wt. percent) | Gel Time at 100° C. (minutes) |
| --- | --- | --- | --- |
| I | Control | 0.00 | 23 |
| II | Chlorosulfonic acid | 0.17 | 160 |
| III | do | 0.33 | 160 |
| IV | do | 0.50 | 150 |
| V | do | 1.00 | 115 |
| V | Fluorosulfonic acid | 0.50 | 155 |

Examples VI–VIII

Sulfuryl chloride is placed in samples of crude pyrolysis product obtained by pilot plant pyrolysis of 1-acetoxy-1,1-dicyano ethane at a temperature of 510° C. Such product contains the same substances described in Examples I to V. The resulting mixtures are maintained at 100° C. The stabilizer utilized, stabilizer concentration and gel time are recorded in the following table:

| Example | Stabilizer | Stabilizer Concentration (Wt. percent) | Gel Time at 100° C. (minutes) |
| --- | --- | --- | --- |
| | Control | 0.00 | 23. |
| VI | Sulfuryl chloride | 0.10 | over 60. |
| VII | do | 0.50 | over 60. |
| VIII | do | 1.00 | over 60. |

Example IX

In order to demonstrate the differences with respect to polymerization products prepared from crude 1,1-dicyano ethylene (obtained by pyrolysis of 1-acetoxy-1,1-dicyano ethane) stabilized according to this invention and similar crude 1,1-dicyano ethylene which is unstabilized (but which is free from water and known catalysts for ionic homopolymerization of 1,1-dicyano ethylene), comparative polymerizations are carried out each involving the use of 198 parts of crude pyrolysis product (46% 1,1-dicyano ethylene content), 800 parts of vinyl acetate (for copolymerization with the 1,1-dicyano ethylene) and 0.4 part of o,o'-dichlorobenzoyl peroxide as a free-radical polymerization catalyst. In run (A) no stabilizer is added to the crude pyrolysis product while in run (B) the pyrolysis product is first stabilized by addition of about 0.05 per cent by weight of chlorosulfonic acid. In each run polymerization is carried out with agitation for two hours at 70° C. In run (A) the polymerization product is of a yellow color and unsuitable for spinning into high quality yarns because of an appreciable amount of low molecular homopolymer of 1,1-dicyano ethylene. In run (B) however, using crude monomer stabilized according to this invention, the polymerization product is completely white in color and consists of high molecular copolymer of 1,1-dicyano ethylene and vinyl acetate, which can be dissolved in solvents therefor and spun into colorless, high quality yarns.

When sulfuryl halides or halosulfonic acids, other than those of the foregoing examples, are utilized as stabilizers of crude monomeric 1,1-dicyano ethylene, stabilizing action similar to that described in the above examples is appreciated.

The above examples have been concerned with stabilizing crude monomeric 1,1-dicyano ethylene obtained by the pyrolysis of 1-acetoxy-1,1-dicyano ethane. However, crude monomer produced in other ways often contains impurities which cause it to polymerize by an ionic mechanism and the presence of the stabilizers of this invention is effective in preventing such polymerization. Accordingly, this invention is not limited to any particular process for securing crude unstable monomeric 1,1-dicyano ethylene.

It is also to be understood that the examples are not intended to otherwise limit the invention, since variations and modifications therein are within the spirit and scope of the appended claims.

I claim:

1. A composition comprising crude unstable monomeric 1,1-dicyano ethylene and a stabilizer, said stabilizer being selected from the class consisting of halosulfonic acids and sulfuryl halides, said stabilizer being present in a concentration of about 0.01% to about 10.0% by weight.

2. A composition comprising monomeric 1,1-dicyano ethylene, acetic acid, other substances resulting from the pyrolysis of 1-acetoxy-1,1-dicyano ethane and a stabilizer, said stabilizer being selected from the class consisting of halosulfonic acids and sulfuryl halides, said stabilizer being present in a concentraton of about 0.01% to about 10% by weight.

3. A composition according to claim 1 wherein the stabilizer is present in a concentration of about 0.01% to about 5.0% by weight.

4. A composition according to claim 1 wherein the stabilizer is present in a concentration of about 0.1% to about 2.0% by weight.

5. A composition comprising crude unstable monomeric 1,1-dicyano ethylene and, as a stabilizer therefor, chlorosulfonic acid, present in a concentration of about 0.01% to 5.0% by weight.

6. A composition comprising crude unstable monomeric 1,1-dicyano ethylene and, as a stabilizer therefor, sulfuryl chloride, present in a concentration of about 0.01% to 5.0% by weight.

7. A composition according to claim 5 wherein the stabilizer is fluorosulfonic acid.

8. A composition according to claim 5 wherein the stabilizer is bromosulfonic acid.

9. A composition according to claim 6 wherein the stabilizer is sulfuryl bromide.

No references cited.